US012287069B2

(12) United States Patent
Ying et al.

(10) Patent No.: US 12,287,069 B2
(45) Date of Patent: Apr. 29, 2025

(54) CRYOGENIC FULL CONTAINMENT STORAGE TANK FOR REALIZING LOW-LIQUID-LEVEL MATERIAL EXTRACTION FUNCTION BY USING PUMP COLUMN

(71) Applicants: CIMC ENRIC ENGINEERING TECHNOLOGY CO., LTD., Nanjing (CN); CIMC ENRIC INVESTMENT HOLDINGS (SHENZHAN) CO., LTD., Shenzhen (CN); CHINA INTERNATIONAL MARINE CONTAINERS (GROUP) LTD., Shenzhen (CN)

(72) Inventors: Jiecheng Ying, Nanjing (CN); Qiang Lu, Nanjing (CN); Shuheng Xiao, Nanjing (CN); Cuiqin Yin, Nanjing (CN)

(73) Assignees: CIMC Enric Engineering Technology Co., Ltd., Jiangsu (CN); CIMC Enric Investment Holdings (Shenzhen) Co., Ltd., Guangdon (CN); China International Marine Containers (Group) Ltd., Guangdon (CN)

( * ) Notice: Subject to any disclaimer, the term of this patent is extended or adjusted under 35 U.S.C. 154(b) by 266 days.

(21) Appl. No.: 17/755,181

(22) PCT Filed: Nov. 27, 2020

(86) PCT No.: PCT/CN2020/132338

§ 371 (c)(1),
(2) Date: Apr. 22, 2022

(87) PCT Pub. No.: WO2021/121013

PCT Pub. Date: Jun. 24, 2021

(65) Prior Publication Data

US 2022/0373138 A1 Nov. 24, 2022

(30) Foreign Application Priority Data

Dec. 16, 2019 (CN) ........................ 201911294570.5

(51) Int. Cl.
*F17C 9/00* (2006.01)
*F17C 13/04* (2006.01)

(52) U.S. Cl.
CPC ................ *F17C 9/00* (2013.01); *F17C 13/04* (2013.01); *F17C 2201/0119* (2013.01);
(Continued)

(58) Field of Classification Search
CPC .... F17C 9/00; F17C 13/04; F17C 2201/0119; F17C 2205/0394; F17C 2223/0161;
(Continued)

(56) References Cited

U.S. PATENT DOCUMENTS

2004/0036617 A1* 2/2004 Hall et al. ......... F17C 2250/041 340/612
2006/0086412 A1* 4/2006 Raynaud et al. ...... F02M 37/10 141/387
(Continued)

FOREIGN PATENT DOCUMENTS

CN 1360144 A 7/2002
CN 104006291 A 8/2014
(Continued)

OTHER PUBLICATIONS

WO 2017159568 A1 Translation (Year: 2017).*
(Continued)

*Primary Examiner* — Elizabeth J Martin
*Assistant Examiner* — Dario Antonio Deleon
(74) *Attorney, Agent, or Firm* — Rosenberg, Klein & Lee

(57) ABSTRACT

A cryogenic full containment storage tank for realizing a low-liquid-level material extraction function by using a
(Continued)

pump column, comprising an inner tank, an outer tank, a pump column, a submersible pump and a material pre-extraction device; wherein the material pre-extraction device comprises a cofferdam, a Venturi mixer, a backflow pipe, a return control valve, a lead-out pipeline and a liquid level detection system. The cryogenic full containment storage tank can make use of a low-temperature medium flowing back from the pump column to extract the low liquid level material outside the cofferdam into the cofferdam to form a local high liquid level and maintain the normal operation of the submersible pump.

19 Claims, 5 Drawing Sheets

(52) U.S. Cl.
CPC ................. *F17C 2205/0394* (2013.01); *F17C 2223/0161* (2013.01); *F17C 2227/0114* (2013.01); *F17C 2227/0135* (2013.01); *F17C 2250/0408* (2013.01); *F17C 2260/02* (2013.01)

(58) Field of Classification Search
CPC ...... F17C 2227/0114; F17C 2227/0135; F17C 2250/0408; F17C 2260/02; F17C 2201/032; F17C 2201/052; F17C 2203/0304; F17C 2203/0629; F17C 2221/032; F17C 2221/033; F17C 2221/035; F17C 2223/0153; F17C 2223/033; F17C 2223/047; F17C 2227/0178; F17C 2250/0417; F17C 2250/061; F17C 2250/0636; F17C 2270/0134; F17C 13/00; F17C 3/00; F17C 13/02; F17C 2205/0302; F17C 2223/013; F17C 2227/04
See application file for complete search history.

(56) References Cited

U.S. PATENT DOCUMENTS

| | | | | |
|---|---|---|---|---|
| 2008/0184735 | A1* | 8/2008 | Joynson et al. | F17C 2201/052 62/613 |
| 2009/0199909 | A1* | 8/2009 | Spittael et al. | B63J 99/00 137/386 |
| 2014/0174106 | A1* | 6/2014 | Tang et al. | F17C 2223/033 62/50.2 |
| 2015/0184645 | A1* | 7/2015 | Johnson | F17C 13/06 62/45.1 |
| 2020/0292099 | A1* | 9/2020 | Li et al. | F04F 5/461 |

FOREIGN PATENT DOCUMENTS

| | | | | | |
|---|---|---|---|---|---|
| CN | 104838128 | A | | 8/2015 | |
| CN | 105318180 | A | | 2/2016 | |
| CN | 105715957 | A | * | 6/2016 | F17C 13/04 |
| CN | 205480170 | U | | 8/2016 | |
| CN | 106969260 | A | | 7/2017 | |
| CN | 206429863 | U | | 8/2017 | |
| CN | 107477360 | A | | 12/2017 | |
| CN | 206973262 | U | | 2/2018 | |
| CN | 208442572 | U | | 1/2019 | |
| CN | 211574758 | U | | 9/2020 | |
| DE | 4336060 | C2 | | 4/1995 | |
| DE | 4342210 | A1 | | 6/1995 | |
| DE | 102004043079 | A1 | | 3/2006 | |
| DE | 102004043080 | A1 | | 3/2006 | |
| DE | 102009007878 | A1 | | 8/2009 | |
| JP | WO 2017159568 | A1 | * | 9/2017 | F17C 13/02 |

OTHER PUBLICATIONS

CN 105715957 A Translation (Year: 2016).*
First Office Action mailed to Corresponding Chinese Patent Application No. 201911294570.5 dated Apr. 16, 2024.
Extended European Search Report mailed to Corresponding Patent Application No. 20903467.7 dated Sep. 20, 2023.

* cited by examiner

CRYOGENIC FULL CONTAINMENT STORAGE TANK FOR REALIZING LOW-LIQUID-LEVEL MATERIAL EXTRACTION FUNCTION BY USING PUMP COLUMN

CROSS-REFERENCE TO RELATED APPLICATIONS

This application is the National Stage of International Patent Application No. PCT/CN2020/132338, filed on Nov. 27, 2020, which claims the priority to Chinese Patent Application No. 201911294570.5, filed on Dec. 16, 2019, the disclosures of which are incorporated herein by reference in their entireties.

TECHNICAL FIELD

The present disclosure relates to the technical field of low-temperature liquefied gas storage, and more particular to a cryogenic full containment storage tank for realizing a low-liquid-level material extraction function by using a pump column.

BACKGROUND

Substances that are gaseous at normal temperature pressure but liquefying after proper freezing can be safely and efficiently stored in storage tanks with low temperature and normal pressure. Substances in the petrochemical industry that meet this characteristic include methane, ethylene, ethane, propylene, propane, butene, butane and other hydrocarbons, and substances in the chemical industry like ammonia commonly. As methane is the main component of natural gas, and propane and butane are the main components of liquefied gas, they are mainly used as industrial and civil clean energy. As people pays more attention to environmental issues around the world, the consumption of clean energy such as liquefied hydrocarbons and liquefied natural gas (hereinafter referred to as LNG) are increasing. In addition, the number and production scale of petrochemical enterprises that further process hydrocarbons as raw material are also increasing, the demand for large low-temperature storage tanks to store these clean energy and liquefied hydrocarbons also rises.

Based on considerations for safety, the existing large low-temperature full containment storage tanks are not allowed to open holes on the wall and bottom. The pipelines connected to the storage tank are all in a top-in and top-out way, that is, the liquid is inputted and outputted from the roof of the storage tank. Due to the large diameter and the large height of the storage tank, the height of the tank dome plus the height of the tank wall is far greater than the suction vacuum height of the liquid, so the discharging pump can only work under the liquid, that is, the discharging pump is a cryogenic submersible pump.

It requires sufficient low-temperature medium in the storage tank to start the cryogenic submersible pump, so the minimum liquid level must not be lower than the minimum operable liquid level required by the cryogenic submersible pump. At present, the minimum operable liquid level of the cryogenic submersible pump plus a certain safety margin is usually about 1.2 m, that is, the zone below 1.2 m from the bottom of the cryogenic full containment storage tank is usually a “dead zone” for operation, which resulting in a large ineffective working volume at the bottom of the tank. For example, an inner tank diameter of 50000 $m^3$ cryogenic full containment storage tank is about Φ46 m, so a volume with a height of 1.2 m is about 1994 $m^3$. An inner tank diameter of 80000 $m^3$ cryogenic full containment storage tank is about Φ59 m, so a volume with a height of 1.2 m height is about 3280 $m^3$. An inner tank diameter of 160000 $m^3$ cryogenic full containment storage tank is about Φ87 m, and a volume with a height of 1.2 m height is about 7134 $m^3$.

The material on a bottom of the tank in range of the ineffective working volume cannot be discharged out of the tank through the cryogenic submersible pump. If the storage tank needs to be shut down for maintenance, the material at the bottom can only be discharged by vaporization, which consumes a lot of energy and also needs a long period of time.

SUMMARY

An object of the present disclosure is to provide a cryogenic full containment storage tank for realizing a low-liquid-level material extraction function by using a pump column.

There is provided an air sterilization device according to embodiments of the present disclosure. The technical solution is as below:

- a cryogenic full containment storage tank for realizing a low-liquid-level material extraction function by using a pump column, comprising: an inner tank, an outer tank surrounding a periphery of the inner tank, the pump column extending through a roof of the outer tank to a bottom of the inner tank, a submersible pump arranged in the pump column, and a material pre-extraction device for extracting low-liquid-level material in cooperation with the pump column. The material pre-extraction device comprises: a cofferdam, arranged at the bottom of the inner tank and surrounding an outside of the pump column, and welded with the bottom of the inner tank to form a pump pool, wherein a height of the cofferdam is greater than the minimum liquid level required for a normal operation of the submersible pump; a Venturi mixer, arranged at the bottom of the inner tank and located outside the cofferdam, two ends of which are respectively an inlet and an outlet, wherein a suction hole is arranged on an outer periphery of the Venturi mixer, and the suction hole is communicated with an interior of the inner tank; a return pipeline, communicating an upper part of the pump column with the inlet of the Venturi mixer; a return control valve, arranged on the return pipeline to control a state of opening and closing and a return flow of the return pipeline; an outlet pipeline, communicating the outlet of the Venturi mixer with an interior of the cofferdam; and a liquid level detection system for detecting a liquid level in the cofferdam, a signal of which is configured to adjust the return control valve, so as to ensure that the liquid level in the cofferdam is not lower than the minimum liquid level required for the normal operation of the submersible pump.

Figure 1:
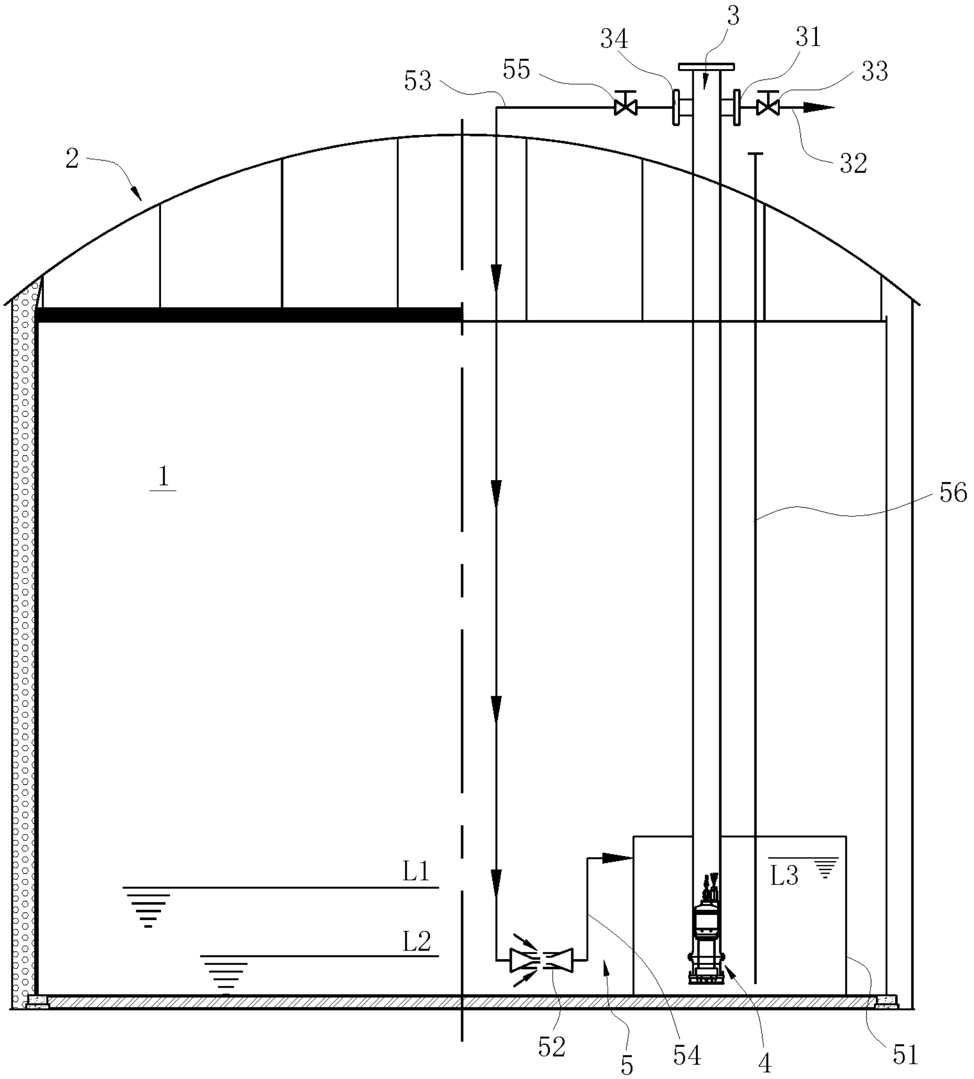
FIG. 1 is a schematic structural diagram of a cryogenic full containment storage tank according to an embodiment of the present disclosure.

The reference numerals are explained as follows: 1, inner tank; 2, outer tank; 3, pump column; 31, discharge port; 32, discharge pipeline; 33, output control valve; 34, return port; 4, submersible pump; 5, material pre-extraction device; 51, cofferdam; 52/52*a*, Venturi mixer; 521, constriction section; 522/522*a*, throat section; 523, diffusion section; 524, suction cavity; 525*a*, suction pipe; 5201, inlet; 5202/5202*a*, suction hole; 5203, outlet; 53, return pipeline; 54, outlet pipeline; 55, return control valve; and 56, liquid level detection system.

DETAILED DESCRIPTION

Exemplary embodiments embodying the features and advantages of the present disclosure will be described in detail in the following description. It should be understood that the present disclosure may have various changes in different embodiments without departing from the scope of the present disclosure, and the descriptions and drawings therein are essentially used for illustrating rather than limiting the present disclosure.

The present disclosure provides a cryogenic full containment storage tank for storing liquefied low-temperature medium. The low-temperature medium may be hydrocarbons such as methane, ethylene, ethane, propylene, propane, butene and butane, and may also be ammonia commonly used in the chemical industry.

Referring to FIG. 1, the cryogenic full containment storage tank provided in this embodiment generally includes an inner tank 1 for storing the low-temperature medium, an outer tank 2 surrounding a periphery of the inner tank 1, a pump column 3 extends through roof of the outer tank 2 to the bottom of the inner tank 1, a submersible pump 4 arranged in the pump column 3, and a material pre-extraction device 5 for extracting the low-liquid-level material from the bottom of the inner tank 1.

Each one of the inner tank 1 and the outer tank 2 generally includes a bottom plate arranged horizontally and a tank wall erected on the bottom plate. A heat insulating layer is provided between the bottom plate of the inner tank 1 and the bottom plate of the outer tank 2, and a heat insulating layer is provided between the tank wall of the inner tank 1 and the tank wall of the outer tank 2. A roof of the outer tank 2 is provided with a dome and a suspended roof plate suspended below the dome, and a heat insulating layer is also arranged on the suspended roof plate. The suspend roof plate is connected to the inner tank 1 with a soft sealing manner. Other specific structures of the inner tank 1 and the outer tank 2 may be refer to the structure of the full containment tank in the relevant art, which will not be described in detail herein.

The pump column 3 extends through the roof of the outer tank 2 nearly to the bottom of the inner tank 1. A discharge port 31 and a return port 34 are opened on a peripheral wall of an upper end of the pump column 3. The discharge port 31 is connected to a discharge pipeline 32 to transport the low-temperature medium outward. In this embodiment, an output control valve 33 is provided on the discharge pipeline 32 to control a state of opening and closing of the discharge pipeline 32 and adjust a flow rate of the discharge pipeline 32. The return port 34 is configured to output the low-temperature medium to the material pre-extraction device 5 to maintain the liquid level in the cofferdam 51 around the pump column 3, and the pump column 3 is configured to realize an extraction of the low-level material in the area outside the cofferdam in the inner tank.

The submersible pump 4 is arranged at a bottom of the pump column 3 and is immersed in the low-temperature medium. When the liquid level where the submersible pump 4 located is above the minimum operable liquid level L1, the submersible pump 4 can pump the low-temperature medium into the pump column 3 and transport them outward through the pump column 3. According to the relevant technical parameters and engineering experience of the traditional submersible pump, the minimum operable liquid level L1 of the submersible pump 4 is approximately about 1.2 m.

The material pre-extraction device 5 cooperates with the pump column 3 to form a local high liquid level area around the pump column 3 to ensure the operation of the pump column 3, so as to extract the low-liquid-level material in other areas in the storage tank. The "low-liquid-level material" refers to the low-temperature medium below the minimum operable liquid level L1 of the submersible pump 4.

Figure 4:
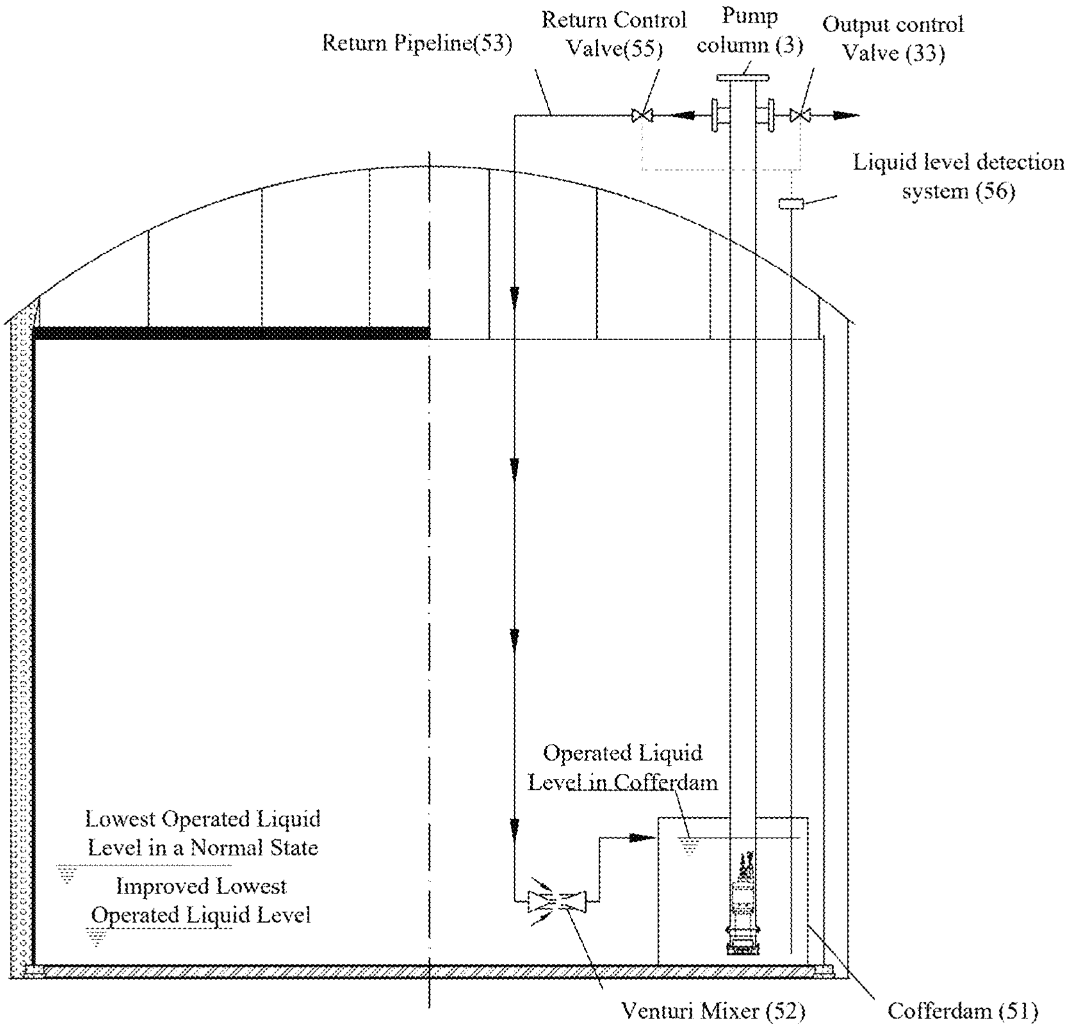
FIG. 4 is a schematic structural diagram of one Venturi mixers in parallel according to the present disclosure.

In this embodiment, as shown in FIG. 4, the material pre-extraction device 5 mainly includes a cofferdam 51, a Venturi mixer 52, a return pipeline 53, an outlet pipeline 54, a return control valve 55 and a liquid level detection system 56.

The cofferdam 51 has a generally hollow cylindrical structure, which is erected on the bottom of the inner tank 1, surrounds an outer side of a lower end of the pump column 3, and is connected to the bottom of the inner tank 1 to form a pump pool. A bottom end of the cofferdam 51 may be welded and fixed with the bottom plate of the inner tank 1, and an upper end of the tank wall is an opening communicating with an inner space of the inner tank 1. A height of the cofferdam 51 is greater than the minimum operable liquid level L1 required for a normal operation of the submersible pump 4. A specific height of the cofferdam 51, as well as its cross-sectional shape and size can be designed according to the practical project.

The Venturi mixer 52 is arranged on the bottom plate of the inner tank 1 and is located outside the cofferdam 51. In this embodiment, the Venturi mixer 52 is placed horizontally on the bottom plate of the inner tank 1, so as to have a lower arrangement height.

The Venturi mixer 52 is a liquid-liquid mixer, which mainly includes a constriction section 521, a throat section 522 and a diffusion section 523 connected in sequence. In this embodiment, the Venturi mixer 52 is further provided with a suction cavity 524.

Both the constriction section 521 and the diffusion section 523 are hollow structures with gradual cross-section, a large-end opening of the constriction section 521 is configured as an inlet 5201 of the Venturi mixer 52, and a large-end opening of the diffusion section 523 is configured as an outlet 5203 of the Venturi mixer 52. One end of the throat section 522 is connected to a small-end opening of the constriction section 521, and the other end of the throat section 522 is aligned with a small-end opening of the diffusion section 523. An outlet 5203 of the Venturi mixer 52 is communicated with the cofferdam 51.

The suction cavity 524 is circumferentially disposed around the throat section 522, forming a dual cavity structure at the throat section 522. Two ends of the suction cavity 524 are respectively connected to an outer wall of the constriction section 521 and an outer wall of the diffusion section 523. An outer peripheral wall of the suction cavity 524 is provided with a plurality of suction holes 5202, and these suction holes 5202 are communicated with an interior of the inner tank 1, so that the low-temperature medium in the inner tank 1 can be sucked into the suction cavity 524. An annular cavity is formed between the suction cavity 524 and the throat section 522, and the suction cavity 524 is communicated with the throat section 522, so the low-temperature medium in the suction cavity 524 can further enter the throat section 522.

The return pipeline 53 extends through the roof of the outer tank 2 to the bottom of the inner tank 1. An upper end of the return pipeline 53 is located outside the outer tank 2 and is connected to the return port 34 of the pump column 3 through the return control valve 55, and a lower end of the return pipeline 53 is connected to the inlet 5201 of the Venturi mixer 52. The return pipeline 53 is communicated with the interior of the pump column 3 through the Venturi mixer 52, so that the low-temperature medium in the pump column 3 can be returned to the Venturi mixer 52 for pre-extraction operation.

The return control valve 55 is located outside the outer tank 2. The return control valve 55 is configured to control a state of opening and closing of the return pipeline 53, and adjust a flow rate of the low-temperature medium returned from the pump column 3 to the return pipeline 53.

The outlet pipeline 54 is located inside the inner tank 1, one end of which is connected to the outlet 5203 of the Venturi mixer 52, and the other end is communicated with the interior of the cofferdam 51, so as to output the low-temperature medium in the Venturi mixer 52 into the cofferdam 51. The outlet pipeline 54 may be communicated with the interior of the cofferdam 51 through a peripheral wall of the cofferdam 51, or may be communicated with the interior of the cofferdam 51 through an upper end of the cofferdam 51. In this embodiment, the outlet 5203 of the Venturi mixer 52 faces the cofferdam 51, so that a length of the outlet pipeline 54 can also be shortened, thereby reducing the flow resistance.

The liquid level detection system 56 is provided corresponding to the cofferdam 51 to detect a liquid level in the cofferdam 51. The liquid level detection system 56 may be a radar level gauge, a servo level gauge, or the like. The liquid level detection system 56 is electrically connected to the return control valve 55 and the output control valve 33, to control the opening, closing and open degree of the return control valve 55 and the output control valve 33 through the detected liquid level signal, thereby adjusting the return flow and output flow.

The above-mentioned cofferdam 51, the Venturi mixer 52, the return pipeline 53, the outlet pipeline 54 and the return control valve 55 are all required to be capable of withstanding the temperature of the extracted low-temperature medium, so they are made of low-temperature material capable of withstanding the corresponding temperature.

A working principle of the cryogenic full containment storage tank is roughly as follows.

When the liquid level in the inner tank 1 is greater than the height of the cofferdam 51, the submersible pump 4 can work normally and pump the low-temperature medium into the pump column 3, because the height of the cofferdam 51 is greater than the minimum operable liquid level L1 of the submersible pump 4. The output control valve 33 of the pump column 3 is opened, and the low-temperature medium is outputted through the discharge port 31 and the discharge pipeline 32. During a process of outputting the low-temperature medium outward, the liquid level in the inner tank 1 continuously drops, and the liquid levels inside and outside the cofferdam 51 drop synchronously.

In this circumstance, the return control valve 55 of the material pre-extraction device 5 closes the return pipeline 53, and the low-temperature medium in the pump column 3 cannot enter the Venturi mixer 52 through the return port 34 and the return pipeline 53, and the material pre-extraction device 5 does not work.

When the liquid level in the inner tank 1 drops to the height of the cofferdam 51, the submersible pump 4 continues to work to pump the low-temperature medium in the cofferdam 51 outward. In this circumstance, only the liquid level in the cofferdam 51 drops, and the liquid level outside the cofferdam 51 is maintained at the height of the cofferdam 51.

When the submersible pump 4 continues to work and the liquid level in the cofferdam 51 drops to a preset liquid level L3, the return control valve 55 of the material pre-extraction device 5 is opened to make the return pipeline 53 conduct, and the low-temperature medium in the pump column 3 enters the return pipeline 53 through the return port 34, and are then outputted into the Venturi mixer 52 to generate a suction effect. The low-temperature medium located outside the cofferdam 51 in the inner tank 1 are sucked into the Venturi mixer 52, and the mixed low-temperature medium are then outputted from the Venturi mixer 52 to the interior of the cofferdam 51 by the outputted pipeline 54, thereby raising the liquid level inside the cofferdam 51 to maintain the operation of the submersible pump 4.

The preset liquid level L3 is greater than the minimum operable liquid level L1 of the submersible pump 4, which may be reasonably set according to parameters such as the flow rate of the submersible pump 4 and the suction efficiency of the Venturi mixer 52. If the height of the cofferdam 51 is appropriate, the preset liquid level L3 may also be set to the height of the cofferdam 51.

Figure 2:
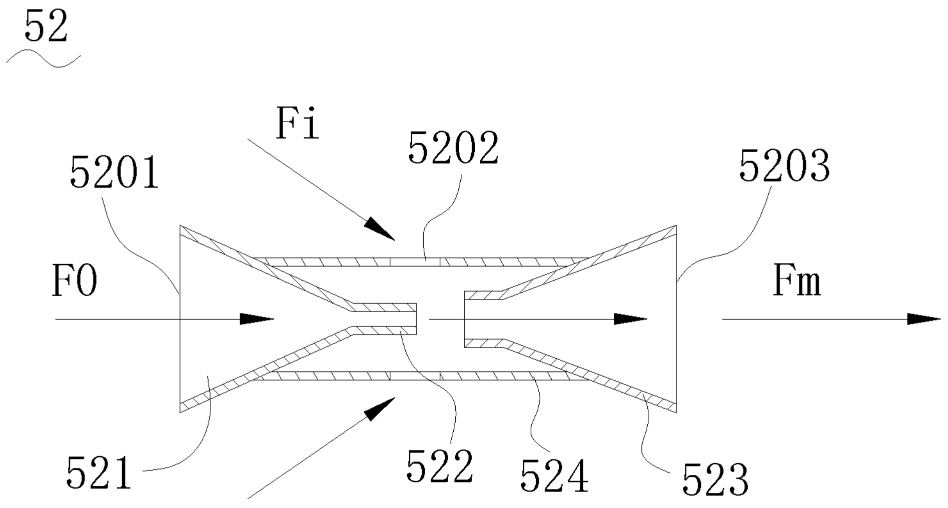
FIG. 2 is a schematic diagram showing a principle of mixing the low-temperature medium in a Venturi mixer in FIG. 1.

FIG. 2 illustratively shows the mixing principle of the low-temperature medium in the Venturi mixer 52. The low-temperature medium enter the Venturi mixer 52 through the return pipeline 53 is initial low-temperature medium F0. According to the Bernoulli's (energy conservation) principle and the momentum transfer principle (momentum conservation), after the initial low-temperature medium F0 enters the Venturi mixer 52, in the process of flowing from the constriction section 521 to the throat section 522, due to a decrease of the flow cross-sectional area, the flow rate increases, and the pressure decreases, resulting in an entrainment effect of local low pressure and high-speed flow at the throat section 522. Thus, the low-temperature medium Fi in the inner tank 1 enters the Venturi mixer 52 through the suction hole 5202 under the action of the pressure difference. The sucked low-temperature medium Fi is mixed with the initial low-temperature medium F0. Due to an increase of the flow cross-section area, the flow rate reduces, and the pressure increases, the mixed low-temperature medium Fm in the diffusion section 523 enters the cofferdam 51 through the outlet pipeline 54. In this embodiment, a suction cavity 524 is further provided on a periphery of the throat section 522 of the Venturi mixer 52, and the low-temperature medium in the inner tank 1 is first sucked into the suction cavity 524, and then enters the throat section 522 for mixing, so that the momentum of the initial low-temperature medium F0 can be more effectively utilized, and the mixed low-temperature medium is outputted into the cofferdam 51 more smoothly.

A flow rate of the low-temperature medium Fm reaching the cofferdam 51 is greater than a flow rate of the initial low-temperature medium F0 entering the Venturi mixer 52 from the pump column 3, and the excess part is the low-temperature medium extracted from the outside of the cofferdam 51 in the inner tank 1. Through the continuous extraction of the material pre-extraction device 5, the liquid level inside the cofferdam 51 can be raised, so as to ensure that the liquid level around the pump column 3 is higher than the minimum operable liquid level L1 required for the normal operation of the submersible pump 4, thereby ensuring the normal operation of the submersible pump 4.

After the low-temperature medium pumped into the pump column 3 from the submersible pump 4 reaches the upper end of the pump column 3, only a part of the low-temperature medium needs to be returned from the return port 34 to maintain the pre-extraction operation, so as to maintain the local high liquid level in the cofferdam 51, thereby meeting the working requirement of the submersible pump 4 needs to work continuously. The rest of the low-temperature medium can still be outputted from the discharge port 31.

According to the liquid level in the cofferdam 51 detected by the liquid level detection system 56, the return control valve 55 and the output control valve 33 can be controlled to adjust a return flow and an output flow of the low-temperature medium in the pump column 3, so as to keep the height of the liquid level inside the cofferdam 51 is greater than the minimum operable liquid level L1 required by the submersible pump 4, thereby achieving a continuous normal operation of the submersible pump 4.

It should be noted that the conventional cryogenic full containment storage tank itself is equipped with a state monitoring system to monitor the temperature, liquid level, pressure and other parameters of the cryogenic full containment storage tank. In some other not shown embodiments, if the cryogenic full containment storage tank itself is equipped with a state monitoring system which may monitor the liquid level of the cofferdam 51, or if the return control valve 55 and the output control valve 33 may be controlled by some other means, these systems or means may be adopted as the liquid level detection system 56 in this embodiment.

Figure 3:
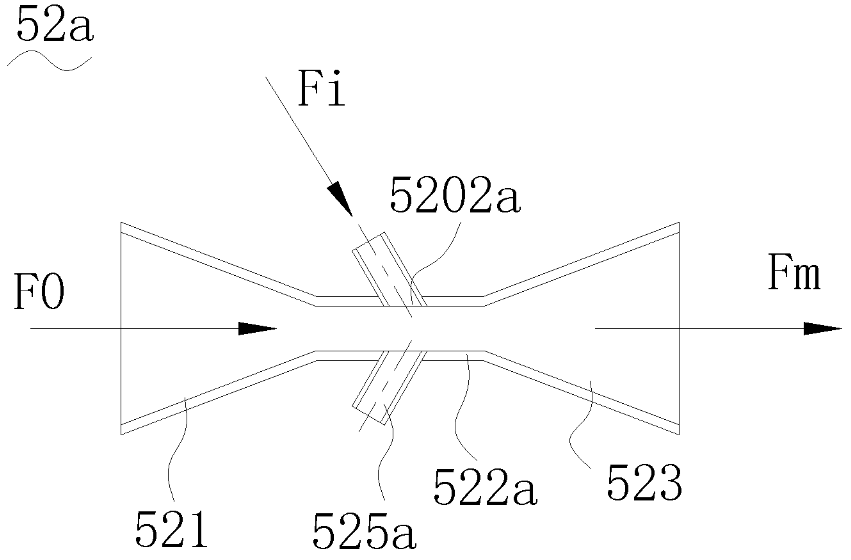
FIG. 3 is a schematic structural diagram of another feasible Venturi mixer according to the present disclosure.

Referring to FIG. 3, in another embodiment, the material pre-extraction device 5 may adopt a Venturi mixer 52*a* in another structural form. In the structure shown in FIG. 3, the Venturi mixer 52*a* is not equipped with the suction cavity 524, but a plurality of suction holes 5202*a* are opened on the outer peripheral wall of the throat section 522*a*, and each suction hole 5202*a* is further provided with a suction pipe 525*a* correspondingly. When the initial low-temperature medium F0 is inputted into the constriction section 521 of the Venturi mixer 52*a*, under the action of the pressure difference, the low-temperature medium Fi in the inner tank 1 can be guided into the throat section 522*a* through the suction pipe 525*a*, and is mixed with the initial low-temperature medium Fi, and the mixed low-temperature medium Fm is outputted to the cofferdam 51.

In some other unshown embodiments, the suction pipe 525*a* may also be removed, and the low-temperature medium Fi in the inner tank 1 is directly sucked through the suction hole 5202*a* on the outer peripheral wall of the throat section 522*a*. In addition, for the structure of the Venturi mixer 52 shown in FIG. 1 and FIG. 2, a suction pipe may be added at the suction hole 5202 of the suction cavity 524.

Figure 5:
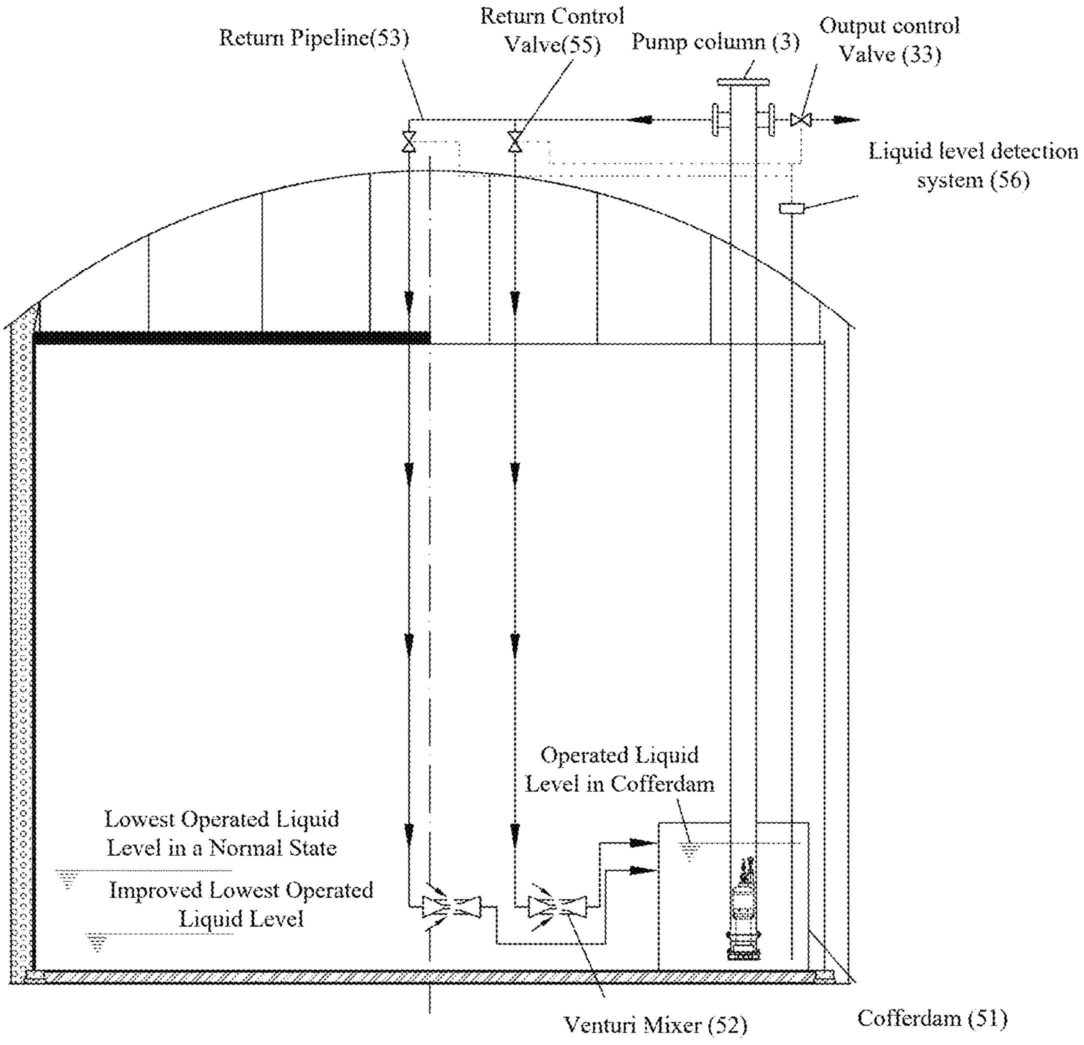
FIG. 5 is a schematic structural diagram of two Venturi mixers in parallel according to the present disclosure.
Figure 6:
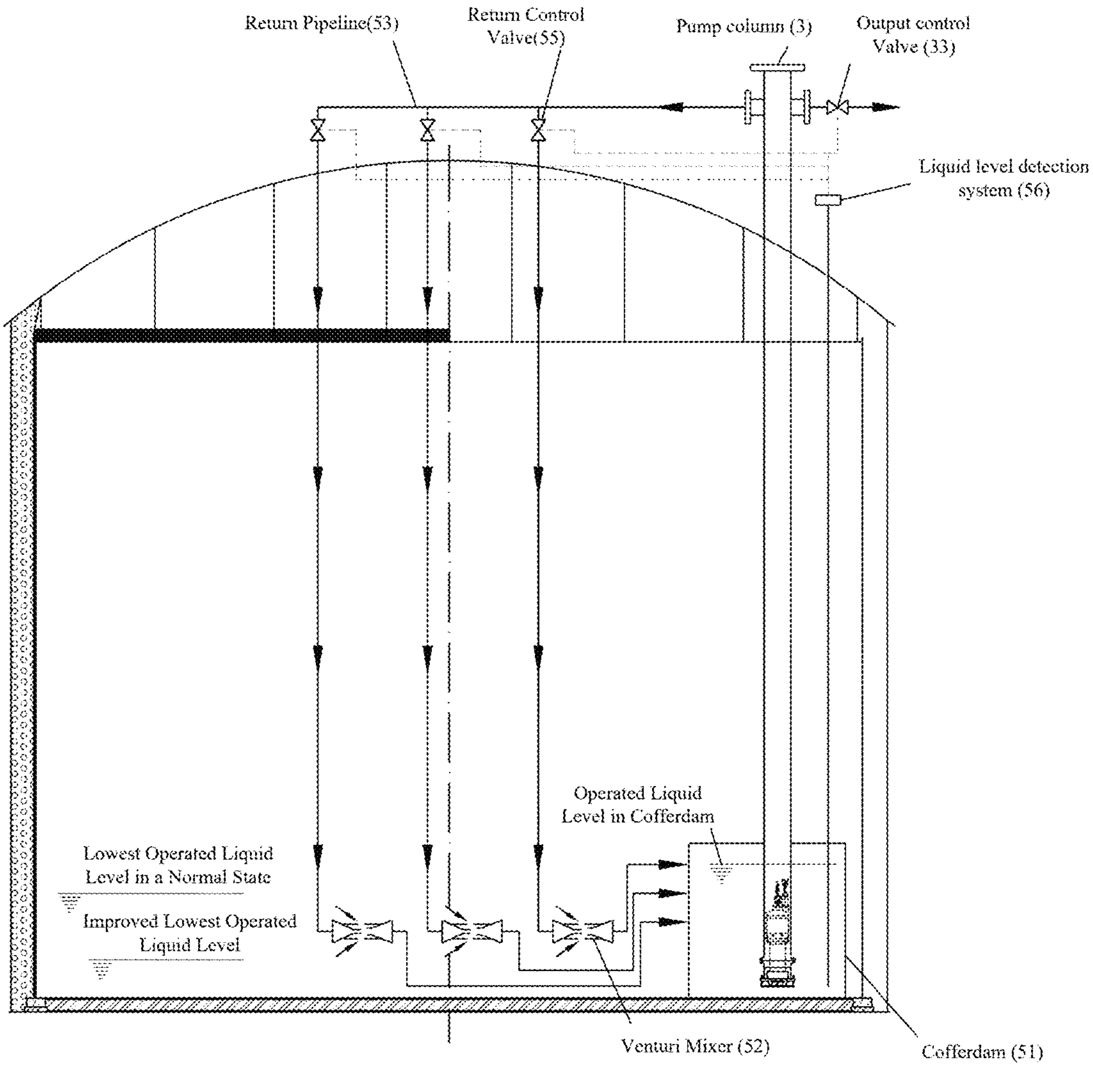
FIG. 6 is a schematic structural diagram of three Venturi mixers in parallel according to the present disclosure.

In the above-mentioned embodiments, only one Venturi mixer 52 is provided as an example. In some other non-illustrated embodiments, if the rated flow rate of the pump column 3 is larger, a plurality of Venturi mixers 52 connected in parallel may also be adopted, as shown in FIGS. 5 and 6, two and three Venturi mixers 52 are connected in parallel. A plurality of return ports 34 of the pump column 3 may be opened correspondingly, so that each Venturi mixer 52 is connected to one return pipeline 53. Alternatively, only one return port 34 may be opened, and the return pipeline 53 is provided with a plurality of branches for connecting to the plurality of Venturi mixers 52. The outlets 5203 of the plurality of Venturi mixers 52 are all connected to the interior of the cofferdam 51, so as to accelerate the supply of low-temperature medium into the cofferdam 51.

Based on the above introduction, in the cryogenic full containment storage tank of this embodiment, after the liquid level in the inner tank 1 is lower than the height of the cofferdam 51, the low-temperature medium outside the cofferdam 51 can be inputted into the cofferdam 51 through the material pre-extraction device 5, forming a local area with a higher liquid level to maintain the normal operation of the submersible pump 4 in the pump column 3. Through this solution, the liquid level inside the cofferdam 51 can be finally lowered to the minimum operable liquid level L1 of the submersible pump 4, and the low-temperature medium outside the cofferdam 51 located above the liquid level of the suction hole 5202 of the Venturi mixer 52 are all extracted into the cofferdam 51 by the material pre-extraction device 5, and the liquid level outside the cofferdam 51 can be lowered to the Venturi mixer 52, and the liquid level in this circumstance is located at L2. The L2 may be approximately 0.2 m to 0.3 m, which is about 1 m lower than the 1.2 m of L1. The diameter of the cofferdam 51 may be roughly designed to be about 3 m to 5 m, which is only about one tenth of the diameter of the inner tank 1 at most. On the whole, through the cooperation of the material pre-extraction device 5 and the pump column 3, the liquid level in the area of about 99% or more in the cryogenic full containment storage tank can be lowered by about 1 m, which significantly reduces the ineffective volume of the cryogenic full containment storage tank, and improves the volume utilization rate of the cryogenic full containment storage tank. In the case of the same tank size, the effective working volume of the full containment tank can be obviously increased. In the case of a certain effective working volume, a tank wall height of the inner tank 1 and a tank wall height of the outer tank 2 can be reduced, thereby saving engineering investment.

In this cryogenic full containment storage tank, the lower limit of the operable liquid level in the cryogenic full containment storage tank can be greatly reduced through a mature and reliable pump column 3 by only adding the relevant facilities of the material pre-extraction device 5. The present disclosure has little investment but remarkable benefit, having a high practical application value. In addition, the Venturi mixer 52, the cofferdam 51 and corresponding pipelines located inside the inner tank 1 can realize a maintenance-free operation in the whole life cycle of the tank.

Although the present disclosure has been described with reference to several exemplary embodiments, it should be understood that the terminology used is used for description and illustration, and not for limitation. Since the present disclosure can be embodied in many forms without departing from the spirit or essence of the invention, it should be understood that the above-described embodiments are not limited to any of the foregoing details, but are to be construed broadly within the spirit and scope defined by the appended claims. Therefore, all changes and modifications that come within the scope of the claims or their equivalents should be covered by the appended claims.

What is claimed is:

1. A cryogenic full containment storage tank for realizing a low-liquid-level material extraction function by using a pump column, applied to petrochemical industry, comprising:

an inner tank;

an outer tank surrounding a periphery of the inner tank;

a pump column extending through a roof of the outer tank to a bottom of the inner tank;

a submersible pump arranged in the pump column; and a material pre-extraction device for extracting low-liquid-level material in cooperation with the pump column, comprising:

a cofferdam with a diameter ranged from 3 m to 5 m and about one tenth of a diameter of the inner tank at most, arranged at the bottom of the inner tank and surrounding an outside of the pump column, and fixed with a bottom of the inner tank to form a pump pool, wherein a height of the cofferdam is greater than a minimum liquid level required for a normal operation of the submersible pump;

a plurality of Venturi mixers connected in parallel, and arranged at the bottom of the inner tank and located outside the cofferdam, two ends of which are respectively an inlet and an outlet, wherein a suction hole is arranged on an outer periphery of the plurality of Venturi mixer, and the suction hole is communicated with an interior of the inner tank;

a return pipeline, communicating an upper part of the pump column with the inlet of the plurality of Venturi mixer;

a return control valve, arranged on the return pipeline to control a state of opening and closing and a return flow of the return pipeline;

an outlet pipeline, communicating the outlet of the plurality of Venturi mixer with an interior of the cofferdam; and a liquid level detection system for detecting a liquid level in the cofferdam to ensure that the liquid level in the cofferdam is not lower than the minimum liquid level required for the normal operation of the submersible pump.

2. The cryogenic full containment storage tank of claim 1, wherein the plurality of Venturi mixer comprises a constriction section, a throat section and a diffusion section connected in sequence, wherein a large-end opening of the constriction section is configured as the inlet of the plurality of Venturi mixer, and is connected to the return pipeline, wherein a large-end opening of the diffusion section is configured as the outlet of the plurality of Venturi mixer, and is connected to the outlet pipeline, wherein two ends of the throat section are respectively connected to a small-end opening of the constriction section and a small-end opening of the diffusion section, and wherein the suction hole is opened corresponding to an outer periphery of the throat section, and is communicated with an interior of the throat section.

3. The cryogenic full containment storage tank of claim 2, wherein the plurality of Venturi mixer further comprises a suction cavity arranged around the outer periphery of the throat section and communicated with the interior of the throat section, wherein two ends of the suction cavity are respectively connected to an outer wall of the constriction section and an outer wall of the diffusion section, and the suction hole is opened on an outer peripheral wall of the suction cavity.

4. The cryogenic full containment storage tank of claim 2, wherein the suction hole of the plurality of Venturi mixer is opened on an outer peripheral wall of the throat section, wherein the Venturi mixer further comprises a suction pipe correspondingly arranged at the suction hole, and the suction pipe is communicated with an interior of the inner tank.

5. The cryogenic full containment storage tank of claim 2, wherein the plurality of Venturi mixer is placed horizontally in the inner tank, and the outlet of the plurality of Venturi mixer is communicated with the cofferdam.

6. The cryogenic full containment storage tank of claim 1, wherein an upper end of the return pipeline is located outside the outer tank and is connected to the pump column, and the return control valve is located outside the outer tank.

7. The cryogenic full containment storage tank of claim 6, wherein an upper peripheral wall of the pump column is respectively provided with a return port and a discharge port, wherein the return port is connected to the return pipeline through the return control valve, the discharge port is connected to a discharge pipeline, and an output control valve is arranged on the discharge pipeline, wherein the return control valve and the output control valve are controlled by a signal of the liquid level detection system.

8. The cryogenic full containment storage tank of claim 7, wherein the liquid level detection system comprises a radar level gauge.

9. The cryogenic full containment storage tank of claim 7, wherein the liquid level detection system is electrically connected to the return control valve and the output control valve, to control a state of opening and closing and an open degree of the return control valve to adjust the return flow, and control a state of opening and closing and an open degree of the output control valve through a detected liquid level signal to adjust an output flow.

10. The cryogenic full containment storage tank of claim 7, wherein the liquid level detection system comprises a servo level gauge.

11. The cryogenic full containment storage tank of claim 1, wherein a plurality of the return ports of the pump column are opened correspondingly, so that each of the plurality of Venturi mixers is connected to one return pipeline.

12. The cryogenic full containment storage tank of claim 1, wherein there is one return port is opened, and the return pipeline is provided with a plurality of branches for connecting to the plurality of the plurality of Venturi mixers.

13. The cryogenic full containment storage tank of claim 1, wherein the outlets of the plurality of the plurality of Venturi mixers are all connected to the interior of the cofferdam, so as to increase a pipeline circulation area for supply of low-temperature medium into the cofferdam.

14. The cryogenic full containment storage tank of claim 1, wherein the outlet of the plurality of Venturi mixer faces the cofferdam, to shorten a length of the outlet pipeline.

15. The cryogenic full containment storage tank of claim 1, wherein the plurality of Venturi mixer is placed horizontally on the bottom of the inner tank.

16. The cryogenic full containment storage tank of claim 1, wherein a bottom end of the cofferdam is fixed with a bottom plate of the inner tank, and an upper end of the cofferdam is an opening communicating with an inner space of the inner tank.

17. The cryogenic full containment storage tank of claim 1, wherein the cofferdam, the plurality of Venturi mixer, the return pipeline, the outlet pipeline and the return control valve are all made of low-temperature material capable of withstanding a temperature of extracted low-temperature medium.

18. The cryogenic full containment storage tank of claim 1, wherein the outlet pipeline is communicated with the interior of the cofferdam through a peripheral wall of the cofferdam.

19. The cryogenic full containment storage tank of claim 1, wherein the outlet pipeline is communicated with the interior of the cofferdam through an upper end of the cofferdam.

* * * * *